(12) United States Patent
Anderson et al.

(10) Patent No.: US 12,085,279 B1
(45) Date of Patent: Sep. 10, 2024

(54) GAS TURBINE COMBUSTOR WITH ENHANCED COOLING FEATURES

(71) Applicant: HONEYWELL INTERNATIONAL INC., Charlotte, NC (US)

(72) Inventors: Jon Anderson, Phoenix, AZ (US); Nagaraja Rudrapatna, Phoenix, AZ (US); Carlos Vallellanes, Aguadilla, PR (US); Atul Verma, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/313,578

(22) Filed: May 8, 2023

(51) Int. Cl.
F23R 3/00 (2006.01)
F02C 7/18 (2006.01)
F23R 3/06 (2006.01)

(52) U.S. Cl.
CPC ............... F23R 3/002 (2013.01); F02C 7/18 (2013.01); F23R 3/06 (2013.01); F05D 2220/32 (2013.01); F05D 2240/35 (2013.01); F05D 2260/202 (2013.01); F05D 2260/22141 (2013.01)

(58) Field of Classification Search
CPC .. F05D 2260/22141; F23R 3/002; F23R 3/06; F23R 3/10; F23R 3/44; F23R 3/46; F23R 3/50; F23R 3/52; F23R 3/54; F23R 3/58; F23R 2900/03342
See application file for complete search history.

(56) References Cited

U.S. PATENT DOCUMENTS

| 3,777,484 | A | 11/1973 | Dibelius et al. |
| 6,408,628 | B1 * | 6/2002 | Pidcock .................. F23R 3/002 60/757 |
| 10,655,540 | B2 | 5/2020 | Carretero Benignos et al. |
| 11,434,772 | B2 | 9/2022 | Griffis et al. |
| 11,480,337 | B2 | 10/2022 | Prociw et al. |
| 2002/0066273 | A1 | 6/2002 | Kitamura et al. |
| 2005/0034399 | A1 | 2/2005 | Pidcock et al. |
| 2005/0047932 | A1 | 3/2005 | Nakae et al. |
| 2010/0186416 | A1 | 7/2010 | Chen et al. |

(Continued)

FOREIGN PATENT DOCUMENTS

| EP | 1098141 A1 | 9/2001 |
| KR | 102080567 B1 | 2/2020 |

OTHER PUBLICATIONS

Zhenglei Yu, Study of Impingement Cooling Technology, Jan. 1, 2022.

(Continued)

*Primary Examiner* — Scott J Walthour
(74) *Attorney, Agent, or Firm* — Lorenz & Kopf LLP (57) ABSTRACT

A combustor for a gas turbine engine includes a combustor liner with a wall defining a combustion chamber. The wall has an inner surface facing the combustion chamber and an outer surface across the wall from the inner surface. Fins are disposed on the outer surface. The wall defines air admission holes that extend through the wall from the outer surface to the inner surface. The wall also defines film cooling holes that extend through the wall from the outer surface to the inner surface. The fins are disposed in areas of the outer surface between the film cooling holes and the air admission holes to cool areas that would otherwise result in hot spots.

20 Claims, 5 Drawing Sheets

(56) References Cited

U.S. PATENT DOCUMENTS

2016/0102861 A1*   4/2016  Cunha ................... F23R 3/002
                                                            60/752
2017/0089580 A1    3/2017  Hu et al.
2019/0017440 A1    1/2019  Porter et al.
2020/0166211 A1*   5/2020  Dudebout ................ F23R 3/06

OTHER PUBLICATIONS

J. J. Scrittore, Investigation of Velocity Profiles for Effusion Cooling of a Combustor Liner, Jul. 24, 2007.

Chen, Numerical investigation on conjugate heat transfer of impingement_effusion double-wall cooling with different crossflow schemes, Jun. 5, 2019.

Oda, Yutaka, et al., "Heat Transfer Characteristics of Pin-Fin Arrays with Ribs to Cool Combustor Liners," Journal of Thermal Science and Technology, vol. 4, No. 4, Apr. 11, 2009.

* cited by examiner

GAS TURBINE COMBUSTOR WITH ENHANCED COOLING FEATURES

STATEMENT REGARDING FEDERALLY SPONSORED RESEARCH OR DEVELOPMENT

This invention was made with Government support under W56HZV22F0061 order for contract number W56HZV-20-D-0062 awarded by the United States Army. The Government has certain rights in this invention.

TECHNICAL FIELD

The present disclosure generally relates to gas turbine engines, and more particularly relates to enhanced cooling features including cooling fins for single-walled combustor liners of gas turbine engines.

BACKGROUND

Gas turbine engines may be employed to power various devices. For example, a gas turbine engine may be employed to power a mobile platform, such as aircraft, land vehicles, sea vehicles and other machines. Generally, gas turbine engines have an engine core, in which gas is combusted to generate a hot combustion gas flow. Certain components of the gas turbine engine, such as the combustor liner, include portions that experience the full effect of the hot combustion gas flow. To regulate the temperature of these components, and therefore reduce the impact of the hot combustion gas flow on the materials from which the components are made, one or more cooling features may be employed. The cooling features may include cooling holes and/or passages. Air delivered from the engine's compressor flows into the combustor through the cooling features to provide cooling. In spite of the cooling holes, hot spots may arise that may be service life limiting for combustors. For example, over time the material from which the combustor is fabricated may deteriorate and/or erode in the presence of the high temperatures.

Accordingly, it is desirable to provide improved cooling for combustors. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a combustor for a gas turbine engine includes a combustor liner with a wall defining a combustion chamber. The wall has an inner surface facing the combustion chamber and an outer surface across the wall from the inner surface. Fins are disposed on the outer surface. The wall defines air admission holes that extend through the wall from the outer surface to the inner surface. The wall also defines film cooling holes that extend through the wall from the outer surface to the inner surface. The fins are disposed in areas of the outer surface between the film cooling holes and the air admission holes to cool areas that would otherwise result in hot spots.

In a number of other embodiments, a combustor for a gas turbine engine includes a combustor liner that has a wall defining a combustion chamber. The wall has an inner surface facing the combustion chamber and an outer surface across the wall from the inner surface. Fins are disposed on the outer surface. The wall defines air admission holes that extend through the wall from the outer surface to the inner surface. The air admission holes admit combustion air into the combustion chamber. The wall defines film cooling holes that extend through the wall from the outer surface to the inner surface. The film cooling holes are configured to admit cooling air through the wall of the combustor liner. The fins are spaced away from the film cooling holes and are made of solid structures without openings. The fins are disposed in areas of the outer surface between the film cooling holes and the air admission holes.

In a number of additional embodiments, a gas turbine engine includes a compressor configured to compress air and a combustor, configured to receive the compressed air from the compressor. The combustor includes a combustor liner with a wall defining a combustion chamber and a passage. The wall has an inner surface facing the combustion chamber and an outer surface disposed across the wall from the inner surface and facing the passage. Fins are disposed on the outer surface and project into the passage. The wall defines air admission holes that extend through the wall from the outer surface to the inner surface to admit the air from the passage into the combustion chamber. The wall defines film cooling holes that extend through the wall from the outer surface to the inner surface to cool the inner surface. The fins are disposed in areas of the outer surface between the film cooling holes and the air admission holes. The fins are formed as solid structures integral with the wall with no through holes through the wall at the fins.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Figure 1:
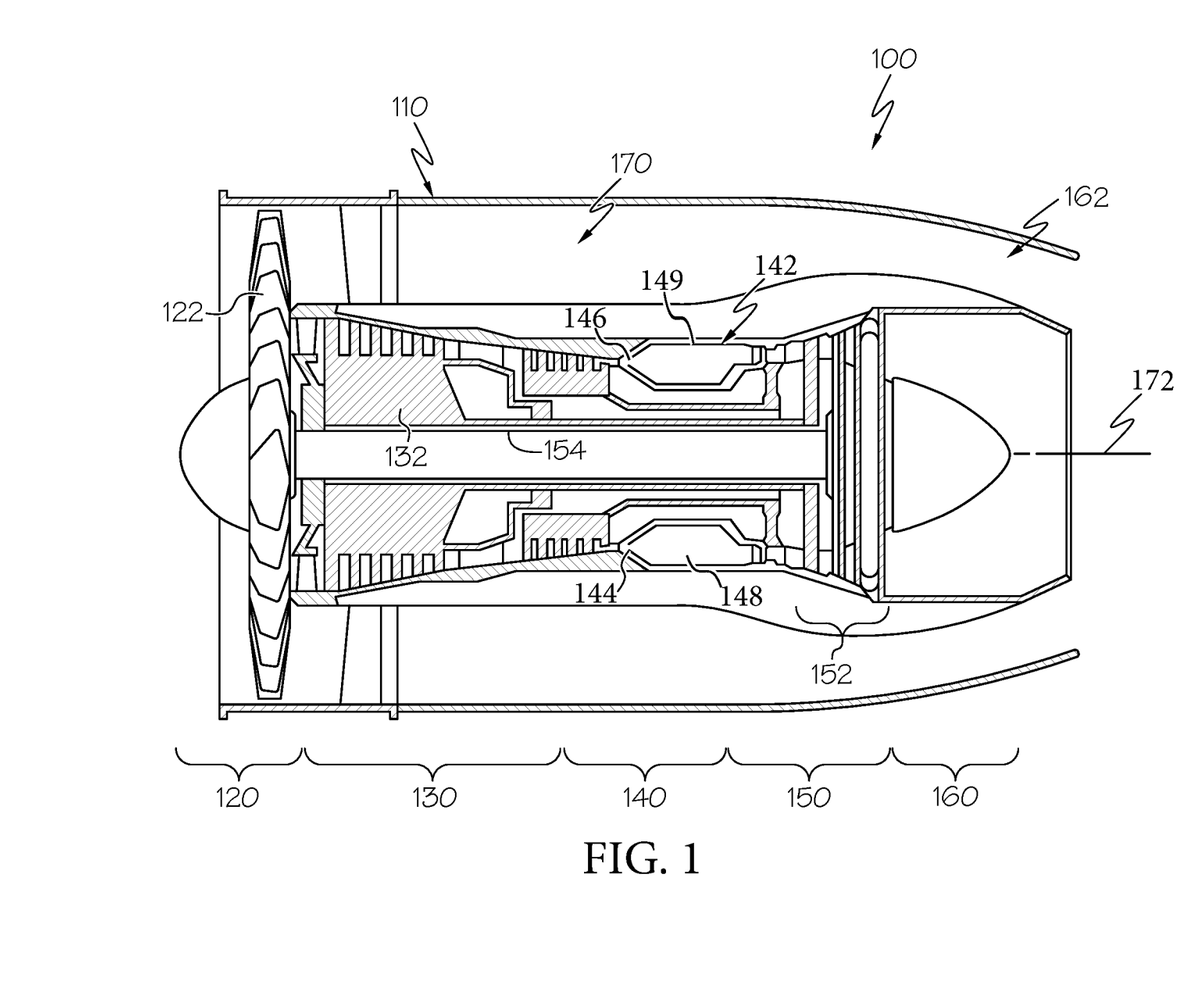
FIG. 1 is a schematic, cross sectional illustration of a gas turbine engine, according to an exemplary embodiment.

Referring to FIG. 1, a schematic, cross-sectional illustration of a gas turbine engine 100 is depicted according to an exemplary embodiment. The gas turbine engine 100 may be used in any of a variety of applications. The gas turbine engine 100 may generally be contained in an engine case 110 and may include an inlet section 120, a compression section 130, a combustion section 140, a turbine section 150, and an exhaust section 160. The rotating parts of the gas turbine engine 100 rotate, such as on a shaft 154, about an axis 172.

The inlet section may include a fan 122, which draws in and accelerates at least a portion of the air directed to the compression section 130. A fraction of the accelerated air from the fan 122 is directed through a bypass section 170. The remaining fraction of air from the fan 122 is directed into the compression section 130. The compression section 130 may include a series of compressors 132 that raise the pressure of the air received from the inlet section 120. The compressors 132 then direct the compressed air to the combustion section 140. In the combustion section 140, the high pressure air is mixed with injected fuel and combusted. The combustion section 140 includes a combustor 142 that, in the current embodiment, is generally formed from one substantially cylindrical and/or conical combustor liner 144 attached to a dome 146. Air from the compression section 130 is generally directed into the combustor liner 144, which contains the combustion process in a combustion chamber 148. Some of the air from the compression section 130 is directed around the outside of the combustor liner 144 through a passage 149. After the combustion section 140, the combusted air is directed into the turbine section 150, which includes a series of turbines 152 to extract energy from the combusted air, which is then exhausted through the exhaust section 160.

Figure 2:
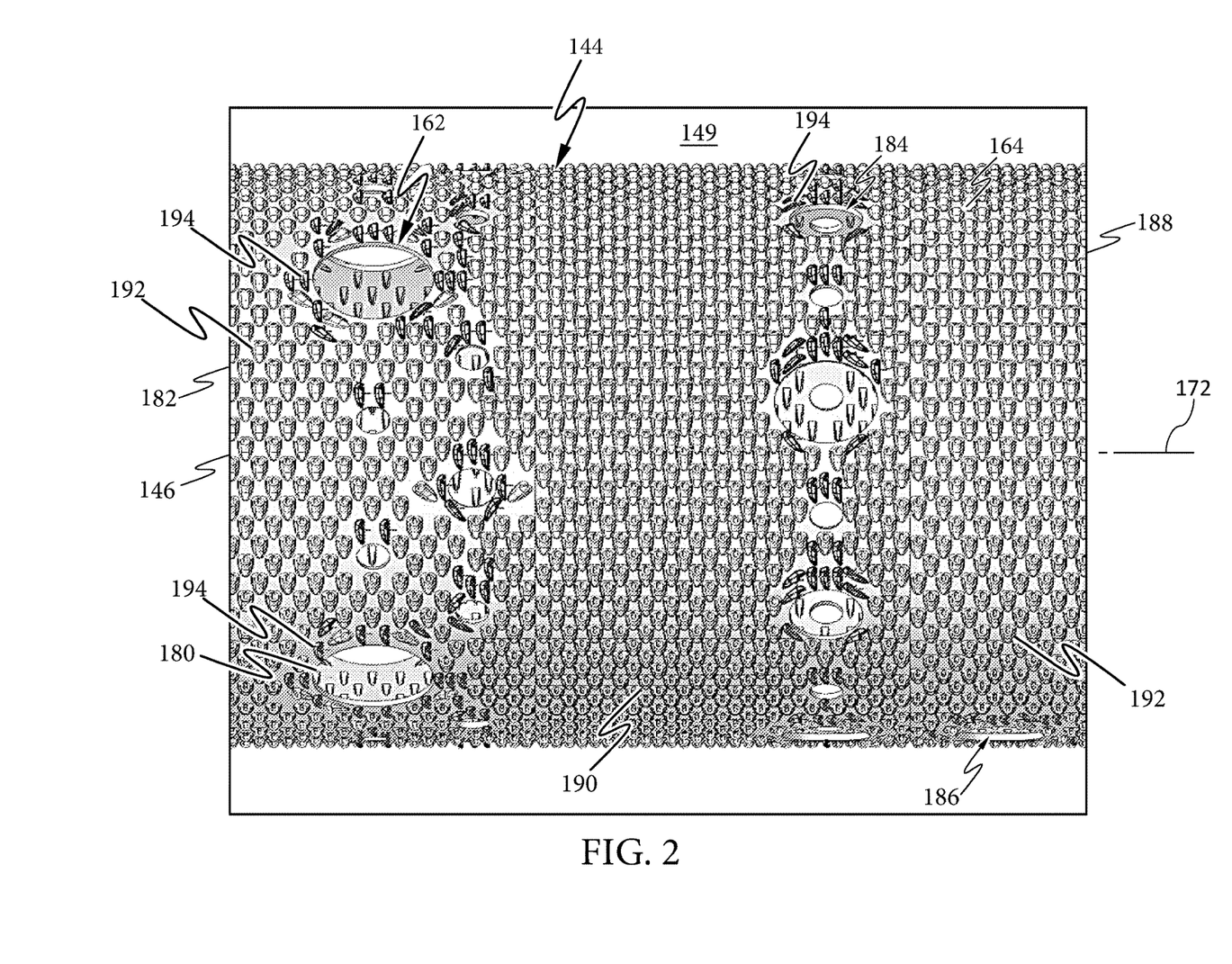
FIG. 2 is a schematic, plan view of the combustor liner of the gas turbine engine of FIG. 1, according to an exemplary embodiment.

Referring additionally to FIG. 2, the combustor liner 144 is of a single-walled type. The combustor liner 144 has a number of air admission holes 162 that extend through the wall 190 of the combustor liner 144 from its outer surface 164 to its inner surface 166 (shown in FIG. 3). The air admission holes 162 allow air to move from the passage 149 into the combustion chamber 148 for combustion. The air admission holes 162 may include any of primary holes 180, intermediate (quench) holes 184 and dilution holes 186. The primary holes 180 provide the main/primary combustion air from the compressors 132 and may be located in the dome 146, near the upstream end 182 of the combustor liner 144 and/or may be configured as injector passages (not shown). This air is mixed with fuel, and then combusted. Intermediate air may be delivered into the combustion zone through a set of the intermediate holes 184 located downstream from the primary holes 182 and part-way along the combustor liner 144, such as about midway, to provide intermediate air to further complete the combustion processes, cooling the air down and diluting the gases. When further dilution is needed, dilution air may be provided into the combustion chamber 148 through the dilution holes 186 in the combustor liner 144 near the downstream end 188 of the combustion chamber 148 for any further combustion in a lean environment and/or to further cool the air before it reaches the turbine section 150.

Figure 3:
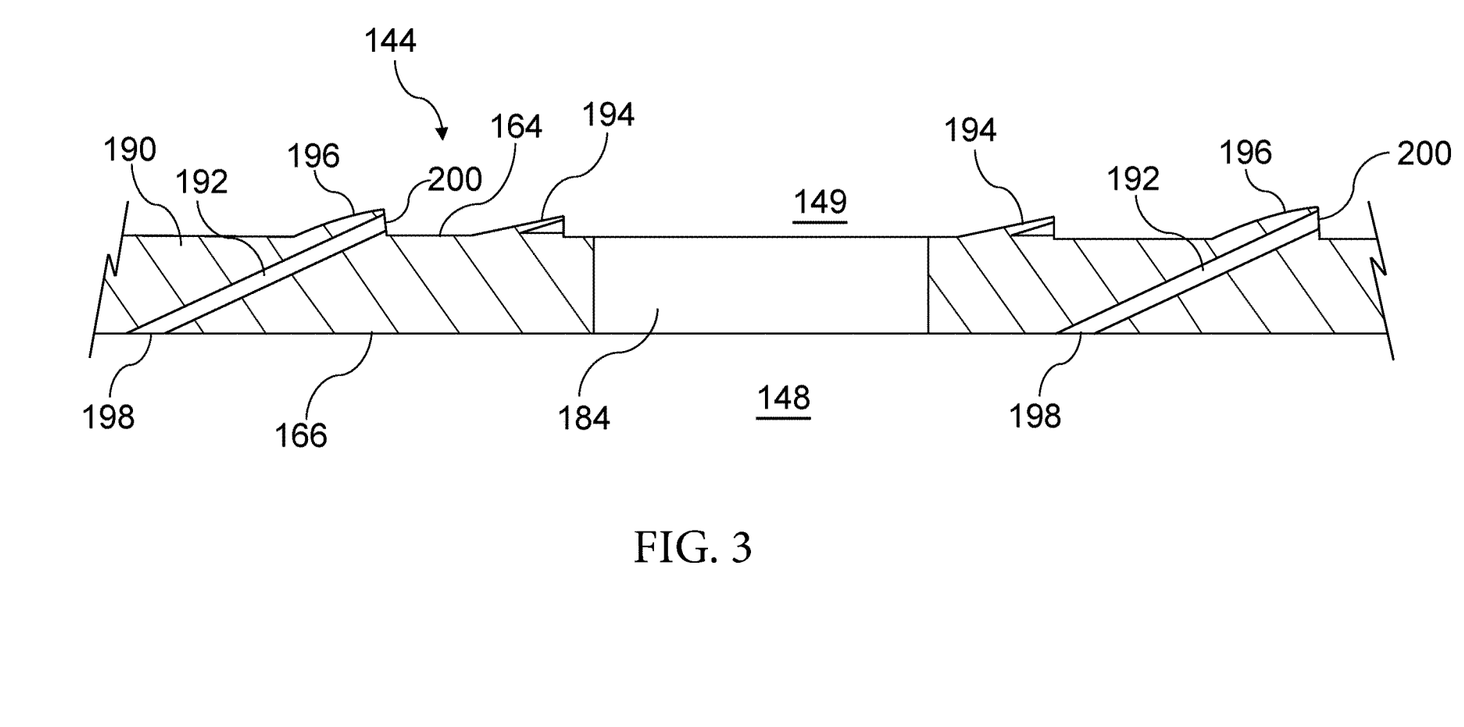
FIG. 3 is a schematic, fragmentary, cross sectional illustration of the intermediate hole area of the combustor liner of FIG. 2, according to an exemplary embodiment.

Referring still to FIGS. 1 and 2, and additionally to FIG. 3, cooling air (air intended for cooling the combustor liner 144 rather than combustion/dilution) is airflow that is injected through film cooling holes 192 in the combustor liner 144 to generate a film layer of cool air at the inner surface 166 of the combustor liner 144 as a barrier to combustion temperatures. The implementation of cooling air is configured so that it does not directly interact with the combustion air and process. The film cooling holes 192 are provided where cooling of the combustor liner 144 is needed and are much smaller in size than the air admission holes 162 included in the combustor liner 144 (for example, an order of magnitude smaller). The air admission holes 162 may include the primary holes 180, the intermediate holes 184 and/or the dilution holes 186 and may be formed as circular holes. The air admission holes 162 extend directly through the wall 190 of the combustor liner 144 form the outer surface 164 to the inner surface 166, generally perpendicular to the axis 172 (shown in FIG. 2). The film cooling holes 192 are formed at shallow angles through the wall 190 of the combustor liner 144 so that they extend through the wall 190 at an incline and over a longitudinal distance along the axis 172. To effectively cool the wall 190, the film cooling holes 192 are positioned, to the extent practical, to provide complete coverage of hot areas of the combustor liner 144. In embodiments, the film cooling holes 192 are configured as bellmouths, with a raised part of the wall (raised structure 196), resulting in mouth-like openings on the outside of the wall 190. Because of the raised structure 196, the layout of the film cooling holes 192 is designed to match the air flow around the outside of the combustor liner 144 to maximize air entry and to avoid flow disturbances.

The film cooling holes 192 may be disposed, in particular, around the intermediate holes 184 where temperatures in the combustion chamber 148 are highest. The film cooling holes 192 are carefully located so that they do not intersect any of the intermediate holes 184 so as to not interfere with the airflow therethrough. As may be seen in FIG. 3, the outlet 198 of each film cooling hole 192 is offset from its inlet 200, meaning the film cooling hole 192 does not follow the shortest path through the wall 190 and the outlet 198 is not directly across the wall 190 from the inlet 200. Because of the design of the film cooling holes 192 to match the airflow and to function properly, positioning them around the intermediate holes 184 is limited. For example, the film cooling holes 192 do not intersect the intermediate holes 184 and the raised structures 196 are not disposed at (are spaced away from) the edges of the intermediate holes 184. As a result, it has been found that providing complete coverage of the wall 190 in the areas around the intermediate holes 184 with the film cooling holes 192 is challenging and leads to areas of the wall 190 that are not covered by the film cooling holes 192. In these areas, the current embodiment includes fins 194 that project radially outward from the outer surface 164 of the wall 190.

In general, areas of the wall 190 that will benefit from additional cooling and that are not covered by the film cooling holes 192 include the fins 194 on the outer surface 164 of the combustor wall 190. The fins 194 provide local heat extraction at any area where needed. This avoids the creation of hot spots that, due to the combustion process, might otherwise subject areas of the wall 190 to heat loads that may limit service life. The areas with the fins 194 may be defined on the outer surface 164 between the intermediate holes 184 and the inlets 200 of the film cooling holes 192. Being disposed on the outer surface 164, the fins 194 are exposed to air flowing through the passage 149. Groupings of the fins 194 are generally disposed around each of the intermediate holes 184. For example, given the airflow around the combustor liner 144, the fins 194 may be located in the wake area (downstream in the air flow direction) around the intermediate holes 184 where hot spots may otherwise form. The air moving through the passage 149 has a tendency to flow both longitudinally and circumferentially around the outer surface 164 of the wall 190. Airflow characteristics including the wake areas may be identified during product development using commercially available fluid dynamics software and/or by performance testing.

Figure 4:
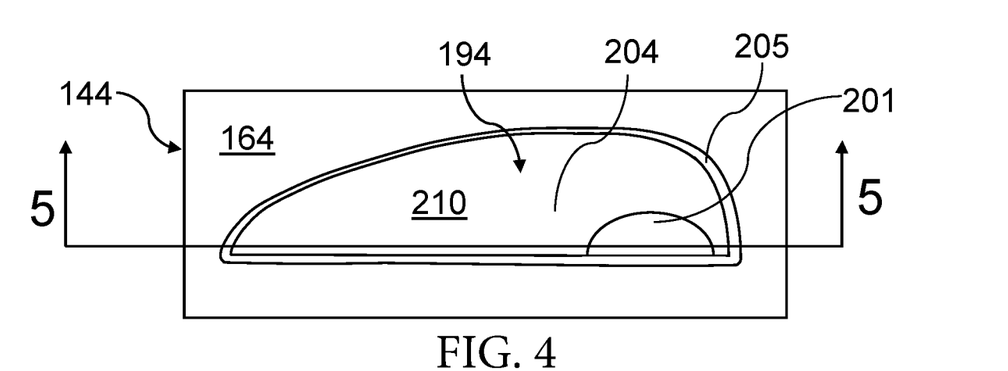
FIG. 4 is a plan view of one cooling fin of the combustor of FIG. 2, according to an exemplary embodiment.
Figure 5:
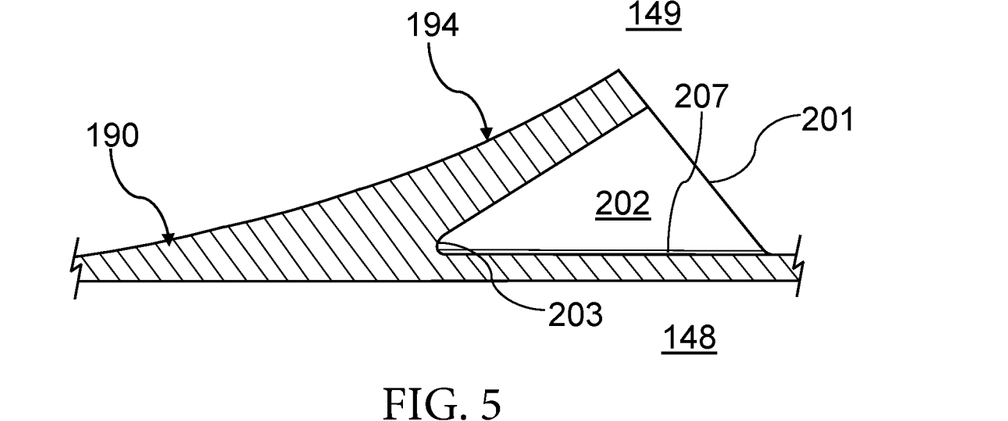
FIG. 5 is a sectional view taken generally through the line 5-5 of FIG. 4, in accordance with an exemplary embodiment.

As shown in plan view in FIG. 4 and in sectional view in FIG. 5, one cooling fin 194 includes a main body 210 that projects radially outward from the outer surface 164 of the combustor liner 144. The main body has an opening 201 forming a cavity 202. The cavity 202 is a blind cavity with an end 203 so that the cavity 202 is open to the passage 149 and is closed to the combustion chamber 148. The definition of the fin 194 accommodates the cavity 202 which may include a pocket 207 to help capture/trap particles, such as fine sand or other particles that are entrained in the air moving through the passage 149 to alleviate occlusion of cooling holes 192 near hot spots. The fins 194 may be configured as shown in FIG. 4 or may be a mirror image with the version chosen for a particular position on the combustor liner 144 determined based on print direction. The fin 194 has a smooth fin outer profile that is aerodynamic to allow air flow without significant interference. A contoured shape 204 of the fin 194 maximizes surface area for heat transfer to the air in the passage 149. The fin 194 includes an integral fillet radius 205 around the periphery of the main body 210 to minimize stresses and enhance durability. The shape of the fin 194 is self-supporting for ease of fabrication by additive manufacturing.

Figure 6:
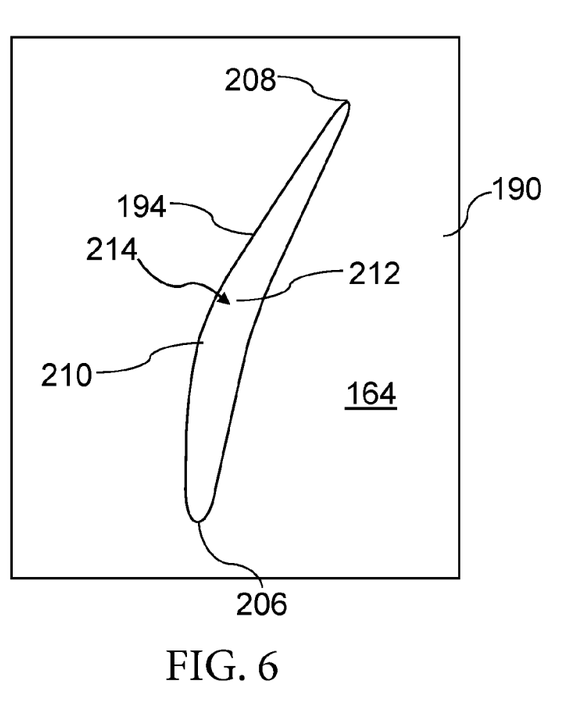
FIG. 6 is a fragmentary, plan view of one fin of the combustor liner of FIG. 2, according to an exemplary embodiment.

Referring additionally to FIG. 6, where one fin 194 is shown in isolation, the fins 194 have an aerodynamic shape to match the airflow around the outside of the wall 190. The aerodynamic shape is designed to minimize disturbances to airflow caused by the projecting fins 194 and to avoid increasing local pressures. One desired result is that air approaching the air admission holes 162, such as the intermediate holes 184, is not disturbed prior to entry. In an embodiment, the aerodynamic shape may be an airfoil shape. The fins 194 each have a leading end 206, a trailing end 208 and a main body 210. The profile of the fins 194 projecting from the outer surface 164 is contoured/rounded rather than extending away in a perpendicular direction placing the highest part 212 of the main body 210 near the middle 214 of the fins 194.

Figure 7:
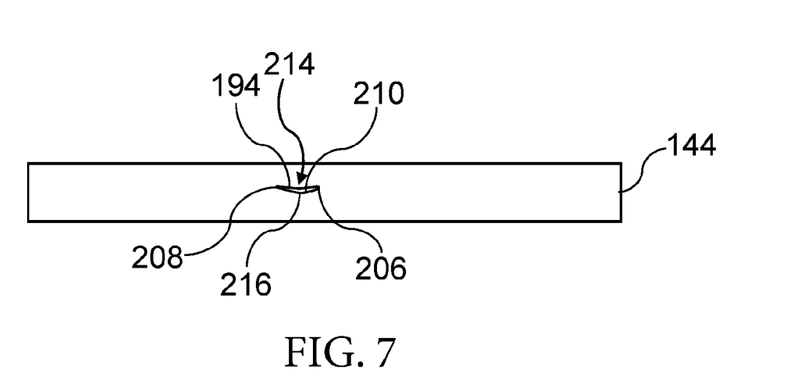
FIG. 7 is a schematic illustration of the additive manufacturing of a section of the combustor liner of FIG. 2, according to an exemplary embodiment.

In embodiments, the combustor liner 144 may be manufactured by an additive manufacturing process such as laser powder bed printing. The aerodynamic shape of the fins 194 provides the added benefit that the fins 194 are self-supporting during the build process. For example, FIG. 7 shows one fin 194 in the build orientation during printing which proceeds in an upward direction in FIG. 7 as layers are built up. The leading end 206 and the trailing end 208 are upward curving tapered elements in this orientation and are built on top of the main body 210 of the fin 194. In addition, forming with the highest part of the fin 194 from the outer surface 164 near the middle 214 of the fin 194 provides support. Printing of the fin 194 integral with the wall 190 starts at the bottom edge 216 (in the illustrated build orientation), and as the build of the fin 194 proceeds with the wall 190, the rounded fin profile angles outward relatively slowly to provide support for higher printed layers without an extreme cantilevered effect.

Accordingly, cooling fins are included on the outer surface of a combustor liner and are disposed in areas around air admission holes such as intermediate (quench) holes and/or in locations where adding through holes is not practical or feasible to the design of the combustor. The fins may be disposed between film cooling holes and the intermediate holes and are shaped to not disturb air flow around the outside of the combustor.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a gas turbine engine, comprising:
   a combustor liner having a wall defining a combustion chamber, the wall having an inner surface facing the combustion chamber and an outer surface across the wall from the inner surface; and
   fins disposed on the outer surface,
   wherein the wall defines air admission holes that extend through the wall from the outer surface to the inner surface, the air admission holes configured to admit combustion air into the combustion chamber,
   wherein the wall defines film cooling holes that extend through the wall from the outer surface to the inner surface, the film cooling holes configured to admit cooling air through the wall of the combustor liner,
   wherein the fins are spaced away from the film cooling holes and comprise solid structures without openings,
   wherein the fins are disposed in areas of the outer surface between the film cooling holes and the air admission holes,
   wherein the film cooling holes are in-part each defined by a raised structure of the wall that extends from the outer surface and that is spaced away from the air admission holes, wherein the raised structure matches the air flowing through the air passage to maximize air entry and to avoid flow disturbances, wherein the air flowing through the air passage creates wake areas downstream of the air admission holes in a direction of the air flowing through the air passage, wherein at least some of the fins are disposed in the wake areas, wherein the at least some of the fins are configured to align with an airflow around the combustor liner, including in the wake areas.

2. The combustor of claim 1, wherein the fins each have an aerodynamic shape with a leading end and a trailing end, with the fins extending around the wall from the leading end to the trailing end.

3. The combustor of claim 1, wherein plural of the fins are disposed around individual holes of the air admission holes.

4. The combustor of claim 1, wherein the film cooling holes are configured to cool the combustor liner along the inner surface and wherein the fins are configured to cool the combustor liner at the outer surface.

5. The combustor is claim 1, wherein the wall comprises an additively manufactured structure with the fins integral with the wall.

6. The combustor of claim 1, wherein the fins each have an aerodynamic shape configured to align with an airflow around the combustor liner and to avoid disturbing a part of the airflow entering the air admission holes.

7. The combustor of claim 1, wherein the fins are disposed in wake areas on downstream sides of the air admission holes.

8. The combustor of claim 1, wherein the fins each include a main body with a fillet radius around a periphery of the main body and joining with the outer surface, the fillet radius configured to minimize stresses.

9. The combustor of claim 1, comprising an air passage defined around the combustor liner, wherein the combustor liner comprises a single-walled structure defining the combustion chamber with the inner surface of the wall exposed to combustion in the combustion chamber and the outer surface of the wall exposed to air in the air passage.

10. A combustor for a gas turbine engine, comprising:
    a combustor liner having a wall defining a combustion chamber, the wall having an inner surface facing the combustion chamber and an outer surface across the wall from the inner surface;
    an air passage defined around the combustor liner and along the outer surface wherein the combustor liner comprises a single-walled structure defining the combustion chamber with the wall exposed to both combustion in the combustion chamber and air flowing through the air passage; and
    fins disposed on the outer surface of the combustor liner with the fins exposed to the air flowing through the air passage,
    wherein the wall defines air admission holes that extend through the wall from the outer surface to the inner surface,
    wherein the wall defines film cooling holes that extend through the wall from the outer surface to the inner surface,
    wherein the air admission holes are configured to allow air to move into the combustion chamber for combustion,
    wherein the film cooling holes are configured to generate a film layer of cool air inside the combustor liner and are disposed at an angle through the wall,
    wherein the air admission holes are substantially larger than the film cooling holes,
    wherein the fins are disposed in areas of the outer surface between the film cooling holes and the air admission holes,
    wherein the fins each have an airfoil shape with a leading end, a trailing end, and a main body between the leading end and the trailing end, with a profile of the fins projecting from the outer surface and being contoured to match an airflow along the outer surface of the wall, the fins spaced apart from the film cooling holes and configured to avoid disturbing a part of the air that moves into the air admission holes.

11. The combustor of claim 10, wherein each fin has an opening forming a cavity, wherein the cavity is a blind cavity with an end so that the cavity is open to the air passage and is closed to the combustion chamber.

12. The combustor of claim 10, wherein groupings of the fins are disposed around individual holes of the air admission holes, the groupings disposed between each respective individual hole of the individual holes and the film cooling holes.

13. The combustor of claim 10, wherein the film cooling holes are in-part each defined by a raised structure of the wall that extends from the outer surface and that is spaced away from the air admission holes, with the fins disposed between the raised structures and the air admission holes.

14. The combustor of claim 10, wherein the wall comprises an additively manufactured structure with the fins integral with the wall.

15. The combustor of claim 10, wherein each of the fins includes a main body, wherein the main body of each of the fins has a profile projecting from the outer surface that is contoured placing a highest part of the main body at a middle of each of the fins.

16. The combustor of claim 10, wherein the fins are disposed in groups next to each other, and adjacent the air admission holes.

17. The combustor of claim 10, wherein the air admission holes comprise quench holes configured to provide air substantially midway along the combustor liner to complete combustion.

18. The combustor of claim 10, wherein the film cooling holes are in-part each defined by a raised structure of the wall that extends from the outer surface and that is spaced away from the air admission holes, wherein the raised structure matches the air flowing through the air passage to maximize air entry and to avoid flow disturbances, wherein the air flowing through the air passage creates wake areas downstream of the air admission holes in a direction of the air flowing through the air passage, wherein at least some of the fins are disposed in the wake areas, wherein the at least some of the fins are not aligned with the raised structures.

19. The combustor of claim 10, wherein the fins each include a main body with a fillet radius around a periphery of the main body and joining with the outer surface, the fillet radius configured to minimize stresses.

20. A gas turbine engine comprising:
   a compressor configured to compress air;
   a combustor, configured to receive the compressed air from the compressor, the combustor including a combustor liner having a wall defining a combustion chamber and an air passage defined around the combustor liner, the wall having an inner surface facing the combustion chamber and an outer surface disposed across the wall from the inner surface and facing the air passage; and
   fins disposed on the outer surface and projecting into the air passage,
   wherein the wall defines air admission holes that extend through the wall from the outer surface to the inner surface to admit the air from the air passage into the combustion chamber,
   wherein the wall defines film cooling holes that extend through the wall from the outer surface to the inner surface to cool the inner surface,
   wherein the air admission holes are configured to allow air to move into the combustion chamber for combustion,
   wherein the film cooling holes are configured to generate a film layer of cool air inside the combustor liner and are disposed at an angle through the wall,
   wherein the air admission holes are substantially larger than the film cooling holes,
   wherein the fins are disposed in areas of the outer surface between the film cooling holes and the air admission holes,
   wherein the fins are formed as solid structures integral with the wall with no through holes through the wall at the fins,
   wherein the fins each have an airfoil shape with a leading end, a trailing end, and a main body between the leading end and the trailing end, with a profile of the fins projecting from the outer surface and being contoured to match an airflow along the outer surface of the wall, the fins spaced apart from the film cooling holes and configured to avoid disturbing a part of the air which moves into the air admission holes, and
   wherein each fin has an opening forming a cavity, wherein the cavity is a blind cavity with an end so that the cavity is open to the air passage and is closed to the combustion chamber.

\* \* \* \* \*